June 23, 1925.
H. A. DAVIS
ROCKER SHAFT BEARING FOR LOOMS
Filed Dec. 27, 1923
1,543,555
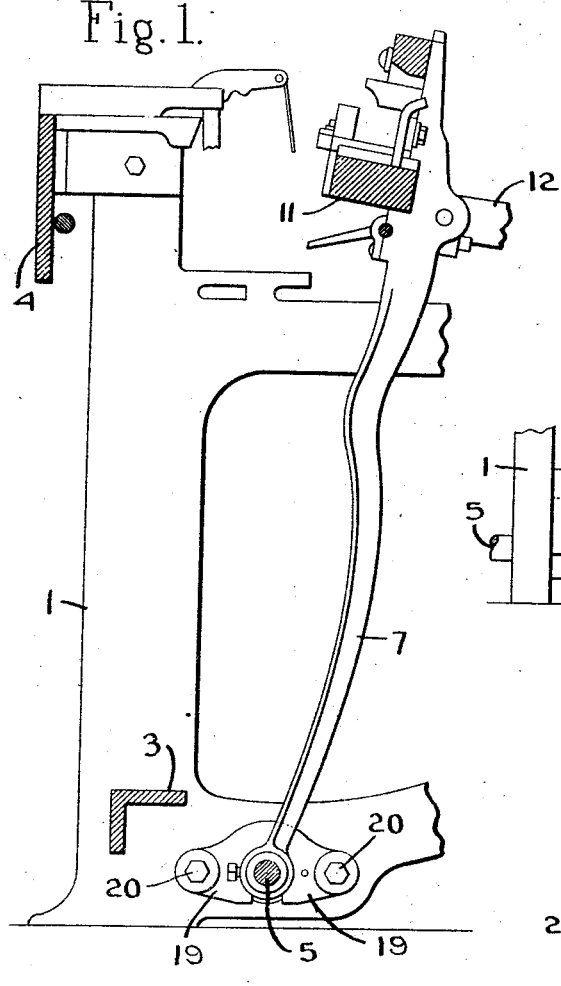
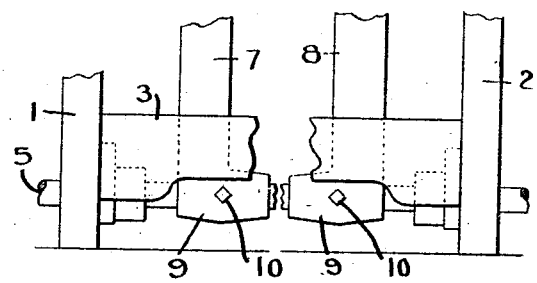
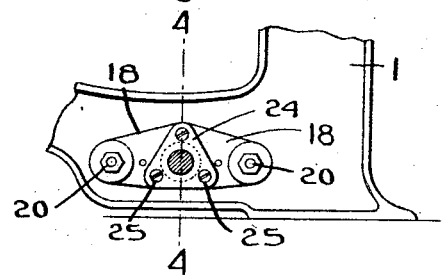
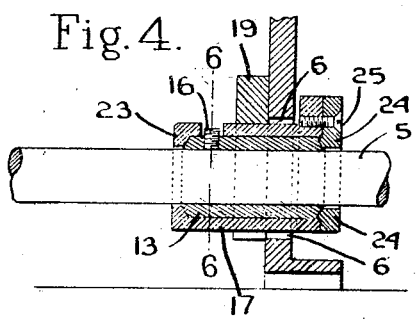
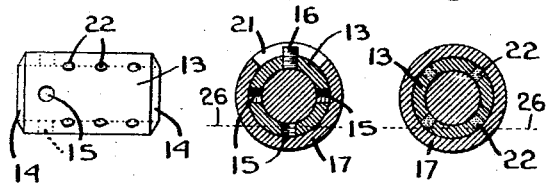
Inventor.
Harry A. Davis
by Heard Smith & Tennan.
Attys Patented June 23, 1925.

1,543,555

UNITED STATES PATENT OFFICE.

HARRY A. DAVIS, OF HOPEDALE, MASSACHUSETTS, ASSIGNOR TO DRAPER CORPORATION, OF HOPEDALE, MASSACHUSETTS, A CORPORATION OF MAINE.

ROCKER-SHAFT BEARING FOR LOOMS.

Application filed December 27, 1923. Serial No. 682,938.

*To all whom it may concern:*

Be it known that I, HARRY A. DAVIS, a citizen of the United States, and resident of Hopedale, county of Worcester, State of Massachusetts, have invented an Improvement in Rocker-Shaft Bearings for Looms, of which the following description, in connection with the accompanying drawing, is a specification, like characters on the drawing representing like parts.

This invention relates to improvements in the lay rocker shaft bearing of a loom. This bearing is an important feature in loom construction because the rocking of the oscillating lay supporting shaft usually results in sufficient wear to cause play or lost motion in the bearings and thus to interfere with the proper operation of the loom. Excessive wear at this point lowers the lay to such an extent, in the case of automatic filling replenishing looms, that the feeler mechanism functions improperly owing, for example, to the feeler striking the wall of the shuttle instead of entering through the feeler slot therein. Furthermore any looseness of these bearings permits a jumping of the lay and in some instances an endwise movement of the lay thus causing the movement to be irregular which in turn produces imperfect weaving. These difficulties have led to the devising of various means in addition to the bearings for supporting the lay or a part of its weight in order to insure accuracy in the movement of the lay.

The object of the present invention is so to construct the loom at these bearing points as to minimize or practically prevent wear and thus cause the lay to move with certainty in a fixed path.

The object of the invention is further to provide a bearing construction in which the bearing is thoroughly and efficiently lubricated and in which the oscillating portion is immersed in an oil retaining pocket thus insuring constant and complete lubrication over the surfaces subject to the greater tendency to wear.

The object of the invention is further to provide a simple and efficient construction at this point which is readily removable and replaceable for convenient assembly and for repair in case any undesirable wear does actually occur.

These and other objects and features of the invention will appear more fully from the accompanying description and drawings and will be particularly pointed out in the claims.

The invention, while applicable to various types of looms, is illustrated herein as embodied in an automatic filling replenishing loom of the well known Northrop type, only such portions of the loom being shown as are necessary to a disclosure of the present invention. Furthermore as the bearing construction is preferably the same at both sides of the loom it is only necessary to illustrate that construction at one side.

In the drawings:

Fig. 1 is a view of a portion of the loom taken in vertical cross section and looking toward the inside of the left hand side of the loom.

Fig. 2 is a view of the lower portion of the loom taken in front elevation and with the middle section broken away.

Fig. 3 is a detail of the lower portion of the loom frame viewed from the left hand side of the loom.

Fig. 4 is a detail chiefly in cross section taken on the line 4—4 of Fig. 3.

Fig. 5 is a top plan view of a bearing sleeve in a preferred construction forming one element of the invention.

Fig. 6 is a detail in cross section taken on the line 6—6 of Fig. 4.

Fig. 7 is a view similar to Fig. 6 with the section taken through the lubricating holes or recesses.

The loom as illustrated comprises the usual side frames 1 and 2 connected at the lower portion and in front by the girder 3 and at the top by the breast beam 4. The lay rocker shaft 5 extends transversely of the loom through apertures 6 in the side frames and supports inside of the frames the lay swords 7 and 8. Each lay sword at its lower end is provided with an extended hub 9 locked by means of a set screw 10 to the shaft 5. At their upper ends the lay swords 7 and 8 support the lay 11 and the usual parts carried thereby. The lay is oscillated back and forth in the usual manner by a connection 12.

The bearing construction for the lay rocker shaft 5 is preferably the same at each side frame and this construction is therefore illustrated in detail only in connection with the side frame 1.

In the construction illustrated a metal bearing sleeve 13 of cylindrical form with its ends 14 in the shape of a truncated cone is provided to fit closely over the rocker shaft 5. This sleeve is mounted on the shaft 5 so as to be rotarily adjustable thereon. For this purpose the sleeve is provided with a plurality or series of radial threaded holes 15, having their central axes in a plane transverse of the axis of the sleeve. A set screw 16 threaded into one of these holes and abutting the shaft 5 serves to lock the sleeve rigidly to the shaft. By removing the set screw and shifting the sleeve to another hole the rotary position of the sleeve on the shaft is adjusted.

An elongated open end metal housing 17 of general cylindrical shape is provided. The internal recess of this housing is of cylindrical form and fits snugly the exterior cylindrical surface of the bearing sleeve 13 and forms the bearing for the sleeve.

This housing is preferably secured to the frame so as to extend through the aperture 6 of the frame. In the construction illustrated this housing is provided on the outside of the frame with a lateral extension 18 at each side and integral therewith. These extensions are bolted to the inner face of the frame. Preferably also a face plate 19 in the form of a yoke, or recessed, to embrace and support the housing is mounted at the opposite side of the frame and secured thereto. In order to secure the extensions 18 and the face plate 19 to the frame bolts 20 are provided which pass through the face plate, frame member and lateral extensions and lock them rigidly together.

The housing 17 is provided at the top with a transverse opening 21 in line with the threaded holes 15 to provide access to the set screw 16 and permit the rotary adjustment of the bearing sleeve 13 on the shaft 5 readily to be made.

The bearing sleeve 13 is provided at various points with holes or recesses 22 to receive, store and distribute lubricant to the bearing surface.

The housing 17 is provided at one end with an annular flange 23 fitting against one end section 14 of the bearing sleeve and at the opposite end with a removable apertured cap 24 fitting against the opposite end section 14 of the bearing sleeve. Thus the bearing sleeve is held against endwise movement in the housing and the removable cap enables the bearing readily to be taken apart and the sleeve to be removed and replaced if necessary. This cap 24 is shown as held in place by screws 25 passing through the flange thereof into the extensions 18 of the housing.

It will thus be seen that not only may access readily be had to the bearing sleeve 13 by the removable end cap 24 but that the entire bearing construction may readily be assembled or removed and replaced for repair. By disconnecting the bolts 20 the face plate 19 may be slipped off endwise from the housing and then the entire housing withdrawn endwise along the shaft through the aperture 6 in the loom frame. In like manner the assembly of the parts is readily effected.

The openings of the annular flange 23 and the removable cap 24 are but slightly larger than the shaft 5 so that the lower portions of these parts 23 and 24 which form the ends of the housing form with the lower segment of the bearing recess in the housing a large oil retaining pocket. This will be understood by referring to Figures 6 and 7 in which the dotted line 26 represents the plane passing through the lowermost portion of the openings in the flange 23 and the cap 24. Oil in the bearing recess of the housing cannot flow out until it reaches this plane when it may pass out through the openings at the ends of the housing. Oil or grease supplied to the bearing, as for example, from the lubrication pockets 22 is distributed by the oscillation of the bearing sleeve over the bearing surfaces and any excess of oil gradually works by gravity to the lower portion of the bearing and is retained in the pocket formed in the bearing recess beneath the plane 26. Thus it will be seen that the lower portion of the bearing, where the greater pressure is exerted and the greater tendency to wear exists, is immersed in the oil retaining pocket thus formed in the housing and thus constant and complete lubrication is insured between that portion of the bearing sleeve and that portion of the housing subjected to the greater tendency to wear.

It will thus be seen that a very simple and efficient construction is provided at this important part of the loom. The extended bearing surfaces between the sleeve 13 and the housing insure rigidity and a minimum amount of wear. The thorough lubrication of the bearing surfaces is an important feature. The provision of the rotary adjustment of the bearing sleeve on the rocker shaft insures that such minimum amount of wear as does take place shall be evenly distributed and not take place entirely at the bottom. The bearing sleeve, and in fact the entire housing, may be readily removed and replaced or repaired whenever necessary.

Having thus described the invention, what is claimed as new, and desired to be secured by Letters Patent, is:

1. In a loom, a frame member, a lay rocker shaft, a bearing sleeve fitted upon the lay rocker shaft and having a series of radial threaded holes, a set screw fitting said holes and acting to lock the sleeve to the shaft and permit rotary adjustment of the sleeve on the shaft, and an elongated open end housing secured to the frame having a cylindrical bearing recess for the bearing sleeve and a transverse opening through the top into the recess to provide access to the screw and permit rotary adjustment of the sleeve.

2. In a loom, the construction defined in claim 1 in which the bearing sleeve is provided with recesses to receive, store and distribute lubricant to the bearing surface.

3. In a loom, a lay rocker shaft, a side frame member apertured for the passage of the lay rocker shaft therethrough, a bearing sleeve mounted on the lay rocker shaft, an elongated open end housing extending through the aperture of the frame member and having a lateral extension secured to the frame member, the said housing having a cylindrical bearing recess for the sleeve and a face plate supporting the housing at the opposite side of the frame member from the lateral extension and secured to the frame member.

4. In a loom, a lay rocker shaft, a side frame member apertured for the passage of the lay rocker shaft therethrough, a bearing sleeve mounted on the lay rocker shaft, an elongated open end housing extending through the aperture of the frame member and having a lateral extension at one face of the frame member, a face plate supporting the housing and extending at the side of the frame member opposite the said extension, and bolts passing through the face plate, frame member and lateral extension and locking them rigidly together, the said housing having a cylindrical bearing recess for the bearing sleeve.

5. In a loom, a frame member, a lay rocker shaft, a bearing sleeve mounted and rotarily adjustable on the lay rocker shaft, an elongated open end housing secured to the frame member, said housing having a cylindrical bearing recess for the bearing sleeve, an annular flange at one end of the housing and a removably apertured cap at the opposite end of the housing to restrict endwise movement of the bearing sleeve and to permit the removal and replacement of the bearing sleeve.

6. In a loom, a frame member, a lay rocker shaft, a bearing sleeve mounted on the lay rocker shaft, an elongated open end housing secured to the frame member, said housing having a cylindrical bearing recess for the bearing sleeve, the bottom portions of the end openings of the housing being located above the bottom of the cylindrical bearing recess whereby the lower segment of the bearing recess of the housing forms an oil retaining pocket to insure constant and complete lubrication between that portion of the sleeve and housing subject to the greater tendency to wear.

7. In a loom, a frame member, a lay rocker shaft, a bearing sleeve mounted on the lay rocker shaft, an elongated open end housing secured to the frame member, said housing having a cylindrical bearing recess for the bearing sleeve, the bottom of the openings in the ends of the housing being close to the bottom of the shaft and above the bottom of the cylindrical bearing recess whereby the lower segment of the bearing recess and the lower portions of the ends of the housing form an oil retaining pocket insuring constant and complete lubrication between that portion of the sleeve and housing subject to the greater tendency to wear.

8. In a loom, the construction defined in claim 5, in which the bearing sleeve is provided with truncated conical ends and in which the annular flange at one end of the housing and the removable apertured cap at the opposite end are provided with truncated conical recesses fitting the ends of the bearing sleeve.

In testimony whereof, I have signed my name to this specification.

HARRY A. DAVIS.